United States Patent [19]

Dye

[11] Patent Number: 4,518,372

[45] Date of Patent: May 21, 1985

[54] IDLER PULLEY AND METHOD OF MOUNTING A PRECISION BEARING

[76] Inventor: Donald D. Dye, P.O. Box 107, Kingman, Kans. 67068

[21] Appl. No.: 544,539

[22] Filed: Oct. 24, 1983

[51] Int. Cl.³ .............................................. F16H 55/14
[52] U.S. Cl. ..................................... 474/94; 474/199; 301/63 DD
[58] Field of Search ............... 474/94, 199; 29/159 R; 301/63 DD

[56] References Cited

U.S. PATENT DOCUMENTS

| | | | |
|---|---|---|---|
| 2,329,901 | 9/1943 | Herrington | 474/94 X |
| 2,884,286 | 4/1959 | Pieper | 474/94 X |
| 3,599,503 | 8/1971 | Schultz, Jr. | 474/94 |
| 3,789,683 | 2/1974 | Frost et al. | 474/199 X |
| 4,072,373 | 2/1978 | Black | 301/5.7 X |
| 4,294,491 | 10/1981 | Black | 301/63 DD |
| 4,295,686 | 10/1981 | Black | 301/63 DD |

FOREIGN PATENT DOCUMENTS

572801  11/1958  Belgium .............................. 474/199

Primary Examiner—James A. Leppink
Assistant Examiner—Frank H. McKenzie, Jr.
Attorney, Agent, or Firm—John H. Widdowson

[57] ABSTRACT

A pulley device having a bearing of precise dimensional tolerance (precision ground) supported in a sheave of less precise tolerance including a ball or roller bearing with an inner and an outer race, and an elastic ring supported by the outer race. The pulley device additionally includes a two piece sheave enclosing the outer race and the ring effective to place the ring under a compressive load whereby the main body of radial load on the pulley is transmitted to the bearing through the ring, resulting in the ring being compressed around the outer surface of the bearing assuring a firm, reliable grip on the bearing, and while the sheaves are in contact with the end portion of the outer race of the bearing to maintain proper roundness of the bearing as precision ground. A method of mounting a precision bearing in a sheave whose dimensions are less precise where the sheave is composed of two disc-like elements substantially identical but of opposite hand comprising the steps of mounting an elastic ring on the outside diameter of the outer bearing race and compressing the elastic ring against the bearing race by bringing the disc-like elements together in face to face contacts so as to encircle the bearing and the ring. The method additionally includes securing thereafter the disc-like elements together by riveting, bolting or the like.

10 Claims, 5 Drawing Figures

IDLER PULLEY AND METHOD OF MOUNTING A PRECISION BEARING

BACKGROUND OF THE INVENTION

1. Field of the Invention

This invention provides a pulley device having a bearing of precise dimensional tolerance supported in a sheave of less precise tolerance. More specifically, this invention contemplates a novel pulley device and a method of mounting a precision bearing in a sheave whose dimensions are less precise where the sheave is composed of two disc-like elements substantially identical but of opposite hand.

2. Description of the Prior Art

U.S. Pat. No. 4,295,686 by Black discloses a disc wheel having a bearing mounting wherein the bearing is disposed between the wheel and the hub portion and a resilient ring, or the like, positions the bearing in the assembly. U.S. Pat. No. 4,294,491 by Black discloses substantially the same arrangements as Black's U.S. Pat. No. 4,295,686. U.S. Pat. No. 4,072,373 also by Black illustrates a mounting for a caster wherein the bearing assembly is provided with a resilient mounting means between the bearing races and the wheel itself. None of the foregoing prior art teach or suggests the pulley device and the method of mounting of this invention.

SUMMARY OF THE INVENTION

This invention accomplishes its desired objects by providing a pulley device having a bearing of precise dimensional tolerance (precision ground) supported in a sheave of less precise tolerance comprising a ball or roller bearing having an inner and an outer race, and an elastic ring supported by the outer race. The pulley device has a two piece sheave enclosing the outer race and the ring, effective to place the ring under the compressive load whereby the main body of radial load on the pulley is transmitted to the bearing through the ring, resulting in the ring being compressed around the outer surface of the bearing assuring a firm, reliable grip on the bearing, and while the sheaves are in contact with the end portions of the outer race of the bearing to maintain proper roundness of the bearing in operation as precision ground. This invention also accomplishes its desired objects by providing a novel method of mounting a precision bearing in a sheave whose dimensions are less precise where the sheave is composed of two disclike elements substantially identical but of opposite hand. The method of mounting comprises the steps of mounting an elastic ring on the outside diameter of the outer bearing race, compressing the elastic ring against the bearing race by bringing the disc-like elements together in face to face contact so as to encircle the bearing and the ring, and thereafter securing the disc-like elements together by riveting, bolting, or the like.

It is an object of the invention to provide a novel pulley device which is capable of easily being assembled.

Still further objects of the invention reside in the provisions of a method of mounting a precision bearing in a sheave and a pulley device which can be secured and not deform the outer race of the bearing.

These together with the various ancillary objects and features will become apparent as the following description proceeds, are attained by this invention, preferred embodiments being shown in the accompanying drawings by way of example only, wherein:

DETAILED DESCRIPTION OF THE INVENTION

Figure 1:
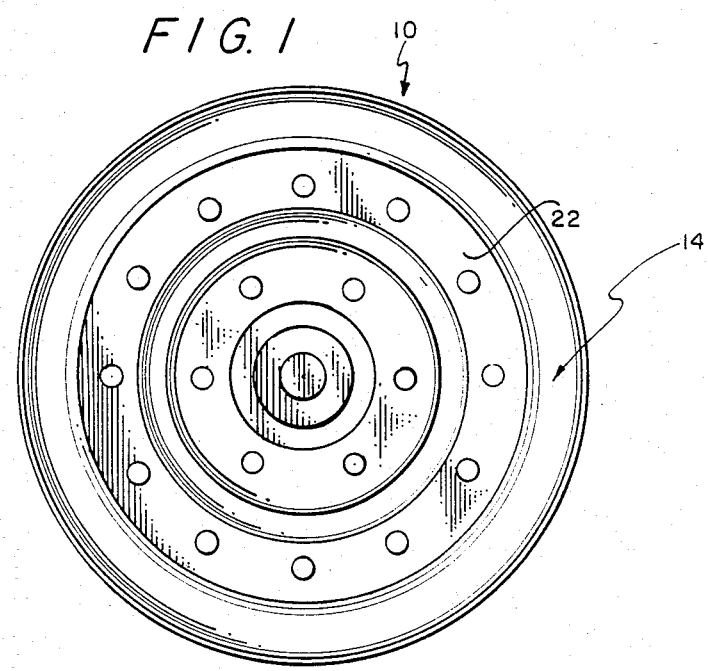
FIG. 1 is a side elevational view of the pulley device.
Figure 2:
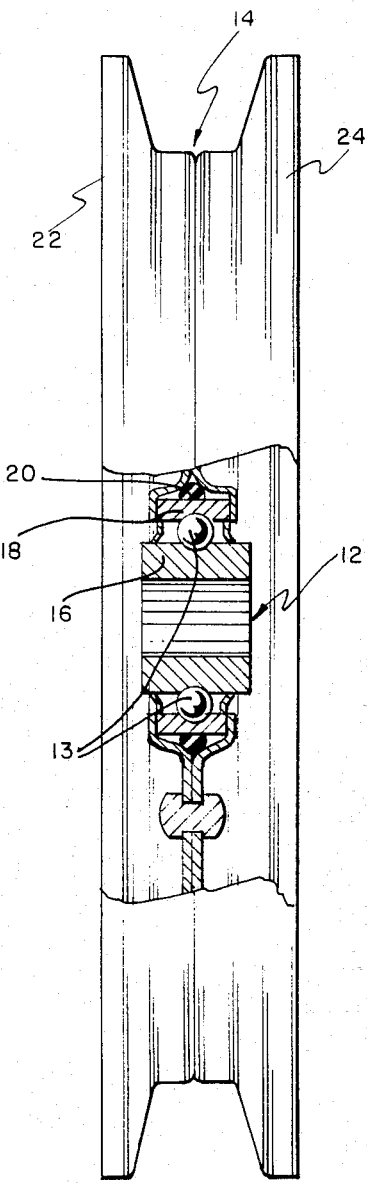
FIG. 2 is an enlarged front elevational view of the pulley device with the bearing assembly illustrated.
Figure 3:
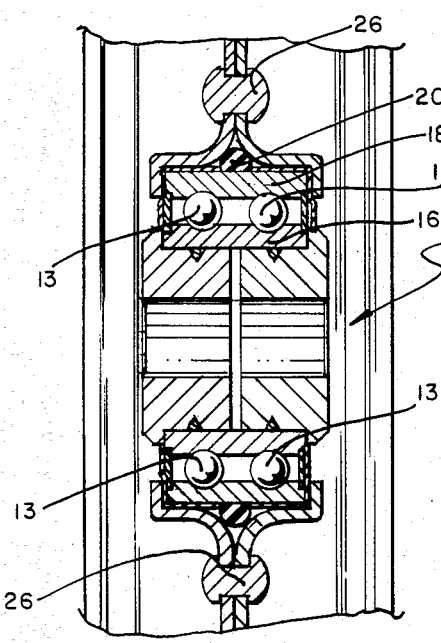
FIG. 3 is an enlarged partial vertical sectional view of the bearing assembly of the pulley device.
Figure 4:
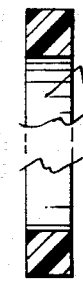
FIG. 4 is a vertical sectional view of a square elastic ring.
Figure 5:
FIG. 5 is a vertical sectional view of a circular elastic ring.

Referring in detail now to the drawings, wherein like reference numerals designate similar parts throughout the various views, a pulley device, generaly illustrated as 10, having a precision ground ball bearing assembly, generally illustrates as 12, of precise dimensional tolerance is supported in a sheave, generally illustrated as 14. The precision ground ball bearing assembly 10 has an inner bearing race 16 and an outer bearing race 18 which sandwiches a plurality of ball bearings 13—13. An elastic ring 20 is supported by the outer bearing race 18. Ring 20 can be of any geometrical shape such as rectangular (see FIG. 4) or circular (see FIG. 5) and is preferably fabricated of an oil resistant, compressable material, such as a synthetic elastomer (neoprene).

Sheave 14 comprises a pair of substantially identical disc-like elements 22, 24 of opposite hand which are secured together by rivets 26, bolt (not shown in the drawings), or the like. Sheave 14 encloses the outer race 18 and the ring 20 to effectively place the ring 20 under a compressive load whereby the main body of the radial load on the pulley 10 is transmitted to the bearing assembly 12 through the ring 20. The compressed ring assures a firm and reliable grip on the bearing 12. The sheave elements 22, 24 are in contact with the end portions of the outer race 18, resulting in the bearing being maintained in proper operating roundness as precision ground in manufacture.

In a preferred embodiment of the invention, the tolerance of the bearings 13—13 is between about 1 to 12 ten thousandths inches. Most preferably, the bearings' 13—13 tolerance is about 3 to 8 ten thousandth inches. Likewise, in a preferred embodiment of the invention, the tolerance of the sheave is between about one to four thousandth inches; most preferably, the tolerance of the sheave is of the order of two to three thousandth inches.

With continuing reference to the drawings for operation of the invention and the method of mounting a precision ground ball bearing 13 in a sheave 14 whose dimensions are less precise where the sheave 14 is composed of the two disc-like elements 22, 24 that are substantially identical but of opposite hand, the elastic ring 20, which is capable of sustaining a compressive load, is mounted on the outside diameter of the outer bearing race 18. Subsequently, the elastic ring 20 is compressed against the outer bearing race 18 by bringing the disc-like elements 22, 24 together in face to face contact so as to encircle the bearing race 18 and the ring 20. The disc-like elements 22, 24 are thereafter secured together by the rivets 26, bolts or the like.

By the practice of this invention, the bearing assembly 12 is held firmly in place with the compression ring 20 or any other suitable compressive oil resistant material. This compression ring 20 will exert a firm grip on the outer race bearing 18 without causing it to shrink or go out of round. Halves 22, 24 of the pulley 14 will fit the bearing assembly 12 firm enough to hold it round but will also, when riveted or otherwise assembled, compress the neoprene ring 20 around the outer bearing race 18 in order to assure a firm and reliable grip on the bearing race 18. The compression neoprene ring 20 added into the bearing assembly 12 will result in additional strength without disturbing the inner bearing clearances. The radial load on the pulley 10 will be transmitted down onto the bearing assembly 12 in a great port through the compression ring 20. This holds the precision ground bearings 13, 13 accurately and firmly so they will not move or spin loose in the pulley 10 but at the same time retain their inner precision tolerances.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A pulley device having a bearing of precise dimensional tolerance supported in a sheave of less precise tolerance comprising a pair of substantially identical disc-like elements of opposite hand flushing against each other at an inner contact point that terminates into an inner circular structure whose vertical cross-section along any point of the perimeter of the inner circular structure generally defines a Y-shape with a pair of arms flaring from a flare point that represents a groove;

a roller bearing means having an inner race and an outer race, said roller bearing means lodging within said inner circular structure such that said outer race is encased within and is in contact with outer ends of the pair of arms of said Y-shaped cross section of said inner circular structure on the outside of said outer race;

an elastic ring means under compression and supported by the outer race and lodged in said groove of said flare point in contact with inner end portions of said pair of arms and with space on each side of said ring between said arms and the outer surface of said outer race, said elastic ring means receiving a compressive load when the main body of the radial load on the pulley is transmitted along said inner contact point to the roller bearing means through said elastic ring means.

2. The device of claim 1 in which the ring is rectangular in cross-section.

3. The device of claim 1 in which the ring is circular in cross-section.

4. The device of claim 1 in which the ring is fabricated of an oil resistant, synthetic elastomer.

5. The device of claim 1 in which the sheave elements are secured together by rivets, bolts or the like.

6. The device of claim 1 in which the tolerance of the bearing is of the order of tenth thousandth inches and the tolerance of the sheave is of the order of two to three thousandth inches.

7. A method of mounting a precision bearing in a sheave whose dimensions are less precise comprising the steps of:

(a) mounting an elastic ring means on the outside diameter of an outer bearing race of a roller bearing means that additionally includes an inner bearing race;

(b) lodging the elastic ring means into a groove representing a flare point of a pair of flaring arms of a Y-shaped vertical cross section of an inner circular structure which represents the termination point of an inner contact point of a pair of substantially identical disc-like elements of opposite hand that are flushed against each other at the inner contact point while simultaneously encasing and positioning outside of said outer bearing race of said roller bearing means within and in contact with the outer ends of the pair of flaring arms of said Y-shaped cross section of said inner circular structure to additionally compress the elastic ring means against the outer surface of the outer bearing race with space on each side of said ring between said arms and the outer surface of said outer race; and (c) securing the disc-like elements together by riveting, bolting or the like.

8. The method of claim 7 where the elastic ring is a synthetic oil resistant elastomer.

9. The method of claim 8 where the ring is capable of sustaining a compressive load.

10. The method of claim 7 where the dimensional tolerance of the bearing ring is of the order of tenth thousandth inches and the tolerance of the sheave is two to three thousandth inches.

* * * * *